United States Patent

Lynch et al.

[11] Patent Number: 5,882,547
[45] Date of Patent: Mar. 16, 1999

[54] X-RAY SCINTILLATORS AND DEVICES INCORPORATING THEM

[75] Inventors: Michael John Lynch, New Berlin, Wis.; Steven Jude Duclos, Clifton Park, N.Y.; Charles David Greskovich; Alok Mani Srivastava, both of Schenectady, N.Y.

[73] Assignee: General Electric Company, Schenectady, N.Y.

[21] Appl. No.: 858,854

[22] Filed: May 19, 1997

Related U.S. Application Data

[60] Provisional application No. 60/024,093 Aug. 16, 1996.

[51] Int. Cl.$^6$ .................................................. C09K 11/78
[52] U.S. Cl. ........................... 252/301.4 R; 501/152; 250/370.11; 250/370.12; 250/362; 372/62
[58] Field of Search ............... 252/301.4 R; 250/370.11, 250/370.12, 362; 372/62; 501/152

[56] References Cited

U.S. PATENT DOCUMENTS

| | | | |
|---|---|---|---|
| 3,322,682 | 5/1967 | Thompson | 252/30.4 R |
| 4,421,671 | 12/1983 | Cusano et al. | 252/301.4 R |
| 4,466,929 | 8/1984 | Greskovich et al. | 264/1.2 |
| 4,466,930 | 8/1984 | Greskovich et al. | 264/1.2 |
| 4,473,513 | 9/1984 | Cusano et al. | 252/301.4 R |
| 4,518,545 | 5/1985 | Cusano et al. | 264/65 |
| 4,518,546 | 5/1985 | Greskovich et al. | 264/1.2 |
| 4,525,628 | 6/1985 | DiBianca et al. | 252/301.4 R |
| 4,571,312 | 2/1986 | Greskovich et al. | 264/1.2 |
| 4,747,973 | 5/1988 | Cusano et al. | 252/301.4 R |
| 4,755,492 | 7/1988 | Greskovich et al. | 501/126 |
| 4,769,353 | 9/1988 | Greskovich et al. | 501/126 |
| 4,783,596 | 11/1988 | Riedner et al. | 252/301.4 R |
| 5,100,598 | 3/1992 | Dole et al. | 264/65 |
| 5,521,387 | 5/1996 | Riedner et al. | 252/301.4 R |

FOREIGN PATENT DOCUMENTS

| | | |
|---|---|---|
| 0097295 | 11/1983 | European Pat. Off. . |
| 0097296 | 11/1983 | European Pat. Off. . |

OTHER PUBLICATIONS

Mildred Ling et al., *UV Absorption Coefficients of $Y_{2(1-x-y)}Gd_{2x}Eu_{2y}O_3$ Phosphors*, 89 Extended Abstracts 832–33 (1989), no month.

*Primary Examiner*—Melissa Bonner
*Attorney, Agent, or Firm*—Tyler Maddry; Noreen C. Johnson

[57] ABSTRACT

Decay time in scintillator compositions comprising yttrium or lutetium and gadolinium oxides and europium oxide is decreased by incorporating therein at least one of the oxides of ytterbium, samarium, praseodymium, neodymium, dysprosium, holmium, thulium, cerium and erbium as an acceptor. Other properties including afterglow and radiation damage are maintained at acceptable levels.

13 Claims, No Drawings

X-RAY SCINTILLATORS AND DEVICES INCORPORATING THEM

CROSS-REFERENCE TO RELATED APPLICATION

This application claims priority from copending provisional application Ser. No. 60/24,093, filed Aug. 16, 1996.

BACKGROUND OF THE INVENTION

This invention relates to X-ray detectors, and more particularly to solid state detectors having improved radiation characteristics including decreased decay time.

Solid state scintillator materials are in common use as components of radiation detectors in X-ray detection apparatus such as counters, image intensifiers and computerized tomography (CT) scanners. One embodiment of the present generation of solid state ceramic scintillators comprises oxide mixtures in which a rare earth oxide is present as an activator, along with various combined matrix elements which are also usually rare earth oxides. Other combined metals may also be present as additives for specific purposes.

These scintillators have been characterized by the advantageous properties of high efficiency, moderate decay time, low afterglow and little or no radiation damage upon exposure to high X-ray doses.

Scan times of CT systems are related to primary decay time (sometimes simply "decay time" hereinafter) of the scintillator roughly by a factor of 1,000. Thus, a scintillator having a decay time of 1 millisecond will typically produce a scan time of about 1 second. The scanning units containing the present generation of scintillators have scan times on the order of 1 second, and in any event no lower than about 0.7 second.

In future generations of CT scanners and the like, shorter scan times are desired. This is true because decreasing scan time makes possible an increase in patient volume covered in a given time, usually a single breath hold. Also, it reduces image blurring due to motion of internal organs and of non-cooperating patients, including pediatric patients.

Scan times of this magnitude may be achievable if the primary decay time of the scanner is shortened. In general, scan time in seconds is associated with a primary decay time of an equal number of milliseconds. A decay time on the order of 0.25 millisecond, corresponding to a scan time of 0.25 second, would maximize the ability of the scanner to "keep up" with the data supplied to it. However, any measurable percentage decrease in decay time from that exhibited by the present generation of ceramic scintillators would be a distinct improvement, particularly when accompanied by the other advantageous properties described above.

Among the preferred scintillator compositions in the present generation of CT scanners are the ceramic scintillators employing at least one of the oxides of lutetium, yttrium and gadolinium as matrix materials. These are described in detail, for example, in U.S. Pat. Nos. 4,421,671, 4,473,513, 4,525,628 and 4,783,596. They typically comprise a major proportion of yttria (i.e., $Y_2O_3$), up to about 50 mole percent gadolinia ($Gd_2O_3$) and a minor activating proportion (typically about 0.02–12, preferably about 1–6 and most preferably about 3 mole percent) of a rare earth activator oxide.

Suitable activator oxides, as described in the aforementioned patents, include the oxides of europium, neodymium, ytterbium, dysprosium, terbium and praseodymium. Europium-activated scintillators are often preferred in commercial X-ray detectors by reason of their high luminescent efficiency, low afterglow level and other favorable characteristics. Europium is typically present therein in amounts up to 30 and most often up to about 12, preferably in the range of 1–6 and most preferably about 3 mole percent. Decay times of such scintillators are on the order of 0.9–1.0 millisecond.

The search thus continues for ceramic scintillator compositions having shorter decay times in combination with the aforementioned other advantageous properties.

SUMMARY OF THE INVENTION

The present invention provides improved scintillators having the properties described above. A particularly advantageous property of said scintillators is decreased decay time, which is a result of two factors: employment of europium, often at a high level, as the principal activator, and inclusion of at least one other rare earth metal from a specific class of such metals as an acceptor.

One aspect of the invention is a scintillator composition comprising the following and any reaction products thereof: a major proportion of yttrium oxide or lutetium oxide and a minor proportion of gadolinium oxide as matrix materials, europium oxide in the amount of about 6.1–30 mole percent based on total scintillator composition as an activator producing at least 99% of total scintillation emission, and a minor decay time-decreasing proportion of at least one of the oxides of praseodymium, terbium and ytterbium as an acceptor. As used herein, "scintillation emission" means emission in the portion of the spectrum which includes the visible, infrared and ultraviolet regions.

Another aspect is a scintillator composition comprising the following and any reaction products thereof: a major proportion of yttrium oxide or lutetium oxide and a minor proportion of gadolinium oxide as matrix materials, europium oxide in the amount of about 1–30 mole percent based on total scintillator composition as an activator producing at least 99% of total scintillation emission, and a minor decay time-decreasing proportion of at least one of the oxides of neodymium, dysprosium, samarium, holmium, erbium, thulium and cerium as an acceptor.

A further aspect is a method for producing an X-ray image which comprises preparing a scintillator composition as described above, incorporating a scintillator of said composition in an X-ray detector, subjecting said scintillator composition to X-ray radiation and measuring visible emission from said europium.

DETAILED DESCRIPTION; PREFERRED EMBODIMENTS

The scintillator compositions of the present invention are similar to those of the prior art in that they comprise either yftrium or lutetium and gadolinium in substantial proportions. It should be understood that all metals disclosed herein are present in the scintillator composition in combined form, usually as the oxide, rather than in elemental form.

The invention includes reaction products as well as simple mixtures of the recited materials. It is not known for certain whether said materials actually undergo reaction under the prevailing conditions of preparation or use of the compositions; however, the proportions designated herein are applicable in the presence or absence of any such reaction.

Yttrium is preferably present in major proportion and gadolinium in an amount up to about 45 mole percent, preferably about 25–35 mole percent. Europium, the activator rare earth element, is present in the amount of about 6.1–30, most often about 6.1–12 and preferably about 6.2–7.5 mole percent when the acceptor is praseodymium, terbium or ytterbium, and about 1–30 and preferably about 3–7.5 or 6.1–12 mole percent when it is one or more of the other designated rare earth elements. This is a relatively high europium loading in comparison to the prior art range of 0.02–12 mole percent, and is an essential feature of the invention.

According to the aforementioned patents, other rare earth metals which are effective as activators are neodymium, ytterbium, dysprosium, terbium and praseodymium. These may allegedly be present individually or in admixture with each other. It has been found, however, that the effectiveness of europium as an activator, especially at levels of 3 mole perecent or greater, is so strong that there is no advantage in employing for activation purposes a combination including one of the other disclosed metals in addition to europium.

Indeed, certain of these metals have now been found to perform other purposes when present in effective amounts for those purposes, while the presence of others may be disadvantageous under many circumstances. Dysprosium, for example, may decrease decay time; however, it simultaneously causes a very large increase in afterglow. Therefore, though it is included within the scope of the invention, its use is often not preferred.

Given these deficiencies of one of the metals characterized by the prior art as being acceptable activators, it is surprising that others of the same metals, while not needed or active for that purpose in the presence of europium, can serve as acceptors and thus decrease decay time. In addition, five other rare earth metals, samarium, holmium, erbium, thulium and cerium, have been discovered to have similar properties. The latter five metals are often preferred, with thulium being most preferred.

The proportion of the acceptor metal present in the scintillator composition is an effective amount to decrease decay time. This amount varies according to the metal selected and is typically approximately as follows, based on total scintillator composition:

| | |
|---|---|
| holmium, thulium, erbium, dysprosium and samarium | 0.01–2.0 mole percent; |
| neodymium | 0.02–0.5 mole percent; |
| ytterbium | 0.02–10.0 mole percent; |
| praseodymium and terbium | 50–4,000 mole ppm; |
| cerium | 60–10,000 mole ppm. |

In general, the proportion of yttrium or gadolinium is decreased correspondingly.

It is often preferred to incorporate other materials in the compositions of the invention for specific purposes. For example, praseodymium may be present, typically in amounts on the order of 150–250 ppm by weight based on total scintillator composition, to suppress afterglow even when not employed to decrease decay time. The same is true of terbium. Strontium is also effective for this purpose.

Various metals in combined form including calcium and cerium may be employed individually or in admixture in amounts effective to minimize radiation damage. Another alternative, somewhat less preferred, is to prepare the scintillator compositions in an oxygen-rich atmosphere.

The scintillator compositions of the present invention may be prepared by methods known in the art and described in the aforementioned patents, including both dry and wet methods. These methods include preparation of a suitable powder containing the desired materials in the correct proportions, followed by such operations as calcination, die forming, sintering and/or hot isostatic pressing. The powder may be prepared by mixing such salts as oxides, oxalates, carbonates or nitrates, often in the presence of a liquid such as water or an alcohol or hydrocarbon. The oxalates are often preferred since they are readily converted to the oxides by heating.

The invention is illustrated by a series of examples in which ceramic scintillator compositions were prepared from mixtures of combined yttrium, gadolinium, europium and an additional rare earth metal, said compositions also containing calcium and cerium in radiation damage-suppressing proportions. Preparation was by the oxalate coprecipitation process followed by water washing and removal, drying and calcination. The compositions were then formed into plates by powder compaction and sintered to form transparent ceramic plates.

Decay time was determined as the time required, after termination of a 120-kVp X-ray pulse of 200 milliseconds duration, for the scintillator output to drop to a value of 1/e (about 37%) of its average output during the pulse. Afterglow was determined by an initial X-ray impingement of 500 milliseconds, followed by determination of the emission value 100 milliseconds after turnoff as a percentage of the original value. Radiation damage was the negative change in light output upon X-ray impingement before and after a 120-kVp X-ray dose of 400 rad.

The scintillation properties of the compositions of the invention are given in the following table, in comparison to two controls: Control 1 which is a scintillator of the same composition but without the acceptor element, and Control 2 which contained a lesser proportion of europium and also contained 120 atomic ppm praseodymium.

| Sample | Y | Mole % Gd | Eu | Acceptor Identity | Acceptor Mole % | Decay time change, % | Afterglow, % | Radiation damage, % |
|---|---|---|---|---|---|---|---|---|
| Control 1 | 67 | 26 | 7 | — | — | 0 | 0.004 | 9.8 |
| Control 2 | 67 | 30 | 3 | — | — | +7 | 0.004 | 1.4 |
| 1 | 66 | 26 | 7 | Er | 1.0 | −67 | 0.005 | 4.2 |
| 2 | 66.2 | 26 | 7 | Yb | 1.0 | −46 | 0.006 | 2.3 |
| 3 | 66.2 | 26 | 7 | Tm | 0.8 | −68 | 0.004 | 2.1 |
| 4 | 66 | 26 | 7 | Ho | 1.0 | −68 | 0.005 | 1.2 |
| 5 | 66.5 | 26 | 7 | Nd | 0.5 | −85 | 0.068 | 7.2 |
| 6 | 67 | 26 | 7 | Sm | 0.04 | −10 | 0.038 | 1.5 |
| 7 | 67 | 26 | 7 | Dy | 0.04 | −13 | 0.380 | 1.2 |

It is apparent from the table that the compositions of the invention have substantially lower decay times than comparable Control 1. Afterglow is comparable with the control value in the cases of Samples 1–4, somewhat higher in the case of Samples 5–6, and sustantially higher for Sample 7. Radiation damage as compared to Control 1 is improved for all samples, and especially for Samples 2–4 and 6–7. Control 2, containing a lower proportion of europium than prescribed herein and typical of prior art scintillator materials, had a substanially greater decay time.

What is claimed is:

1. A scintillator composition comprising the following and any reaction products thereof: a major proportion of yttrium oxide or lutetium oxide and a minor proportion of gadolinium oxide as matrix materials, europium oxide in the amount of about 1–30 mole percent based on total scintillator composition as an activator producing at least 99% of total emission, and a minor decay time-decreasing proportion of at least one of the oxides of neodymium, dysprosium, samarium, holmium, erbium, thulium and cerium as an acceptor.

2. A composition according to claim 1 comprising yttrium oxide, gadolinium oxide in an amount up to about 45 mole percent and europium oxide in the amount of about 6.1–12 mole percent.

3. A composition according to claim 2 wherein the acceptor is holmium oxide in the amount of about 0.01–2.0 mole percent.

4. A composition according to claim 2 wherein the acceptor is erbium oxide in the amount of about 0.01–2.0 mole percent.

5. A composition according to claim 2 wherein the acceptor is thulium oxide in the amount of about 0.01–2.0 mole percent.

6. A composition according to claim 2 wherein the acceptor is cerium oxide in the amount of about 60–10,000 ppm.

7. A composition according to claim 2 wherein the acceptor is samarium oxide in the amount of about 0.01–2.0 mole percent.

8. A composition according to claim 2 wherein the acceptor is neodymium oxide in the amount of about 0.02–0.5 mole percent.

9. A composition according to claim 2 wherein the acceptor is dysprosium oxide in the amount of about 0.01–2.0 mole percent.

10. A composition according to claim 9 comprising yttrium oxide, gadolinium oxide in an amount up to about 45 mole percent and europium oxide in the amount of about 3–7.5 mole percent.

11. A method for producing an X-ray image which comprises:

preparing a scintillator composition comprising the following and any reaction products thereof: a major proportion of yttrium oxide or lutetium oxide and a minor proportion of gadolinium oxide as matrix materials, europium oxide in the amount of about 1–30 mole percent based on total scintillator composition as an activator producing at least 99% of total emission, and a minor decay time-decreasing proportion of at least one of the oxides of neodymium, dysprosium, samarium, holmium, erbium, thulium and cerium as an acceptor;

incorporating a scintillator of said composition in an X-ray detector, subjecting said scintillator composition to X-ray radiation and measuring visible emission from said europium.

12. A method according to claim 11 wherein said scintillator composition comprises yttrium oxide, gadolinium oxide in an amount up to about 45 mole percent and europium oxide in the amount of about 6.1–12 mole percent.

13. A method according to claim 11 wherein said scintillator composition comprises yttrium oxide, gadolinium oxide in an amount up to about 45 mole percent and europium oxide in the amount of about 3–7.5 mole percent.

* * * * *